United States Patent [19]
Anderson

[11] Patent Number: 5,868,384
[45] Date of Patent: Feb. 9, 1999

[54] COMPOSITE ELASTOMERIC SPRING

[75] Inventor: David G. Anderson, Chesterton, Ind.

[73] Assignee: Miner Enterprises, Inc., Geneva, Ill.

[21] Appl. No.: 840,306

[22] Filed: Apr. 11, 1997

[51] Int. Cl.$^6$ ........................................................ F16F 7/00
[52] U.S. Cl. .................. 267/141.1; 267/140; 267/140.4; 267/153
[58] Field of Search ................. 267/140, 140.11, 267/140.13, 140.3, 140.1, 141.7, 153, 292, 294; 248/632, 636, 638; 180/300, 312; 403/225, 226, 228

[56] References Cited

U.S. PATENT DOCUMENTS

| | | | |
|---|---|---|---|
| Re. 33,696 | 9/1991 | Stevenson | 267/33 |
| 2,231,769 | 3/1941 | Merrill | 267/153 |
| 2,241,026 | 5/1941 | Wylie | 267/153 |
| 3,160,407 | 12/1964 | Vaugoyeau | 267/153 |
| 3,301,335 | 1/1967 | Snelling | 268/293 |
| 3,343,770 | 9/1967 | Szouu | 267/140.3 |
| 3,402,924 | 9/1968 | Rix | 267/153 |
| 3,409,284 | 11/1968 | Rix | 267/153 |
| 3,447,814 | 6/1969 | Siber et al. | 267/292 |
| 3,584,858 | 6/1971 | Beck | 267/140.3 |
| 3,606,295 | 9/1971 | Atpletar | 267/141.1 |
| 3,892,398 | 7/1975 | Maush | 267/153 |
| 4,053,148 | 10/1977 | Chakueus | 267/153 |
| 4,198,037 | 4/1980 | Anderson | 267/153 |
| 4,566,678 | 1/1986 | Anderson . | |
| 4,688,777 | 8/1987 | Mekosh | 267/141.1 |
| 4,998,997 | 3/1991 | Carlston | 267/3 |
| 5,213,315 | 5/1993 | Havtel et al. | 267/292 |
| 5,280,890 | 1/1994 | Wydra . | |
| 5,326,083 | 7/1994 | Wydra et al. . | |
| 5,335,403 | 8/1994 | Jensen | 29/173 |
| 5,351,844 | 10/1994 | Carlstedt | 213/44 |
| 5,409,199 | 4/1995 | Kahwauu | 267/153 |
| 5,738,330 | 4/1998 | Fokeusetal | 248/632 |

Primary Examiner—Chris Schwartz
Attorney, Agent, or Firm—John W. Harbst

[57] ABSTRACT

A composite elastomeric spring having a predetermined final shape and including a first member of elastomeric material having a first durometer hardness and a second member of elastomeric material having a second durometer hardness is disclosed. The second member has a predetermined initial shape complimentary to an initial shape of the first member. The second member is positioned adjacent and in circumferential surrounding relation relative to the first member to define a preform composite spring member. After the second member is positioned about the first member, a force is applied to the preform composite spring member sufficient to simultaneously compress the first member and the second member thereby permanently changing the initial shapes of the first member and second member are permanently changed from their respective predetermined initial shape such that the first and second members are thereafter maintained in captured relationship relative to each other. The force is then removed from and thereby allowing the preform composite spring to transmute to the final shape of the composite elastomeric spring.

45 Claims, 12 Drawing Sheets

COMPOSITE ELASTOMERIC SPRING

FIELD OF THE INVENTION

The present invention relates generally to elastomeric compression springs and, more particularly, to a composite elastomeric spring for absorbing forces between two masses.

BACKGROUND OF THE INVENTION

The use of elastomeric material in compression springs is commonly known. As discussed in U.S. Pat. Nos. 4,198,037 and 4,566,678, issued on Apr. 15, 1980 and Jan. 28, 1986, respectively to the assignee of the present application, a useful thermoplastic elastomer is a copolyester polymer elastomer such as sold by E.I. duPont de Nemours & Co. of Wilmington, Del., under the trademark HYTREL. As explained in those patents, HYTREL is made from three ingredients, namely, dimethyl terephthalate; polyglycols such as polytetramethylene ether glycol, polyethylene ether glycol or polypropylene ether glycol; and short chain diols like butanediol and ethylene glycol.

Ordinarily, this type of polymer elastomer material has inherent physical properties that make it unsuitable for use as a compression spring. However, the above-mentioned patents describe a method by which the copolyester polymer elastomer material can be converted into a compression spring material. Generally, that method includes the application of a compressive force to a body of material which compresses the body in an axial direction to an extent greater than 30% of its previous axial length. The '678 patent focuses on an improvement wherein a hollow spring is formed to overcome the compression set characteristics of HYTREL. The provision of a central core or opening has been found to enhance the characteristics of the spring and enlarge the scope of applications where such a spring can be utilized. By varying the shape and size of the hollow core, elastomeric springs with various spring rates can be produced to accommodate the loads and deflections needed in particular spring applications.

Notwithstanding these improvements, there remains a need to enhance the characteristics of elastomeric compression springs by increasing energy absorption while maintaining desirable functional characteristics. Typically, elastomeric springs provide force/deflection curves which vary depending on the material and configuration of the spring. As used herein, the term "stiff" refers to those portions of the force/deflection curve that have a relatively sharp upward slope, which indicates a relatively high spring rate. Whether the curve slopes sharply upward at a constant or generally rising rate, such a slope is characteristic of progressively increasing resistance to compressive deformation. The term "soft" refers to those portions of the force/deflection curve that have a relatively gradual slope, and is characteristic of relatively lower spring rate, whether the slope is constant, increasing or decreasing.

SUMMARY OF THE INVENTION

In view of the above, and in accordance with one aspect of the present invention, there is provided a method of making a composite elastomeric spring having increased energy absorption while maintaining desirable functional characteristics. The spring is made from a first member of elastomeric material having a first durometer hardness and a second member of elastomeric material having a second durometer hardness. The second member has a predetermined initial shape complimentary to the first member. The second member is positioned adjacent the first member in surrounding relation about the first member. A force is then applied to the preform composite spring member sufficient to simultaneously compress the first member and second member, thereby changing the shapes of the first member and the second member such that the configurations of the first member and the second member are permanently changed from their respective predetermined initial shape. The force is then removed from the first member and second member.

In a preferred embodiment of the invention, the first member is a cylindrical interior block prior to compression and the second member is configured as an annular exterior layer that is laminated to the interior block by a molding operation. Preferably, the exterior layer completely surrounds the radial surface of the interior block and has a thickness that is between about 5% and 35% of the outer diameter of the preform composite spring member. Also preferably, the interior block and exterior layer are both made of a copolyester polymer elastomer material. In one embodiment, the durometer hardness of the interior block is lower than the durometer hardness of the exterior layer. Thus, the soft interior block has a greater tendency to spring back than the stiffer exterior layer upon the application of a force thereon.

Preferably, the interior block has an initial cylindrical core opening extending axially therethrough. Upon application of the initial axial force, the configuration of the initial core opening is also permanently expanded transversely outwardly to thereby provide a hollow compression spring member.

The present invention has yielded unexpected results and provides significant advantages over other elastomeric springs. The outer layer of elastomeric material having a different durometer hardness than the interior block provides increased energy absorption while resisting excessive rebound, thereby maintaining desirable functional characteristics.

The composite elastomeric spring of the present invention can be useful in numerous applications to absorb energy. For example, the composite elastomeric spring can be incorporated in draft gears used on rail cars to absorb shock during coupling and other physical impact forces that may occur between rail cars. The spring can also be incorporated in side bearing units for use with an articulated railroad car, or as a combination of springs with the friction shoes in a suspension/shock absorber system for a rail car. The spring can also be designed and used for purposes other than industrial compression springs, for example, as isolation and vibration dampers, such as in motor mount applications. They are also useful as energy absorption bumpers or cushions in the automotive industry and other industries.

The present invention, together with further objects and advantages, will be best understood by reference to the following detailed description taken in conjunction with the accompanying drawings.

DETAILED DESCRIPTION OF THE PREFERRED EMBODIMENT(S)

While the present invention is susceptible of embodiment in various forms, there is shown in the drawings and will hereinafter be described preferred embodiments of the invention with the understanding that the present disclosure is to be considered as setting forth exemplifications of the invention which are not intended to limit the invention to the specific embodiment illustrated.

Figure 1:
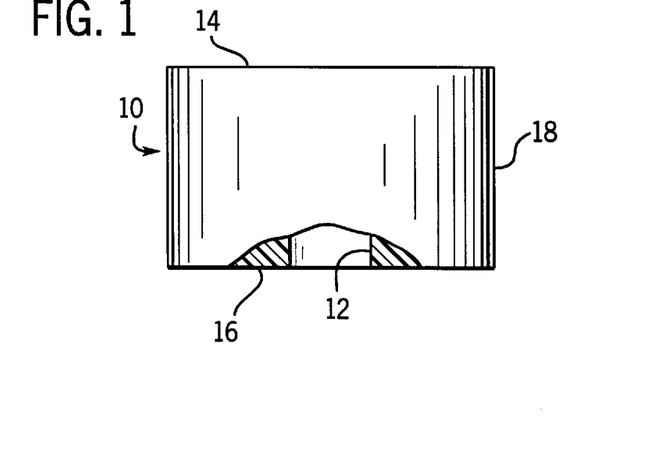
FIG. 1 is a front elevational view of a cylindrical interior block of copolymer polyester elastomer material which can be used to produce a composite elastomeric spring in accordance with the present invention.

Referring now to the drawings, wherein like reference numerals refer to like parts throughout the several views, there is shown in FIG. 1 an interior block 10 of elastomeric material. The block 10 is preferably cylindrical and has a central core opening 12 extending axially therethrough from a top end wall 14 to a bottom end wall 16. The block 10 is made of elastomeric material having tensile characteristics such that the ratio of plastic strain to elastic strain is greater than 1.5 to 1. One such elastomer is a copolyester polymer elastomer manufactured and sold by E.I. du Pont de Nemours under the trademark HYTREL. This elastomer is reasonably inert and is quite durable, and it is not subject to tearing or to crack propagation even when made in relatively thin cross-sections. Preferably, the interior block 10 is made of du Pont's HYTREL composition No. 5556, which is relatively soft to provide resistance to initial set, thereby enhancing elastic characteristics in use. Normally, the selected elastomer is purchased in pellet form and is injected or extruded into a mold to form the interior block 10. Various plastic molding techniques such as melt casting, injection molding, rotational molding, etc. may be used to make the interior block 10. The central core opening 12 can also be formed as part of a molding process, or the central core opening 12 can be drilled through a solid block 10. As illustrated in FIG. 1, the interior block 10 has an exterior lateral or radial surface 18 and an initial axial length defined as the distance between the top end wall 14 and the bottom end wall 16.

Figure 2:
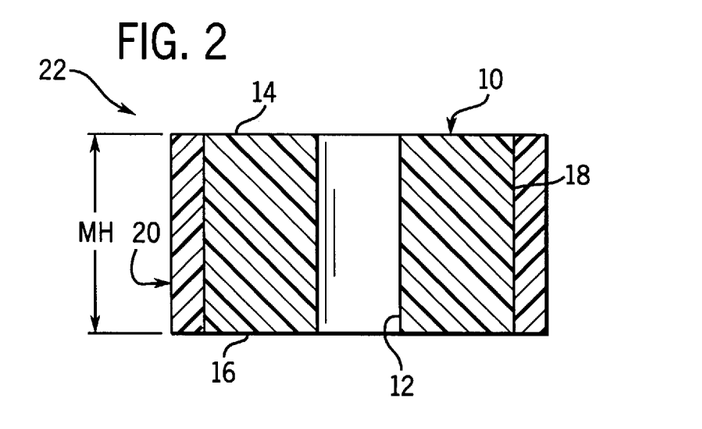
FIG. 2 is a front cross-sectional elevational view of a preform composite spring prior to application of an axial compressive force, and illustrating a central axial core in the interior block and an annular exterior layer of elastomeric material molded to the interior block.

The next step in the process is to anneal the interior block 10. The annealing time could extend to about one-hundred eighty hours for particular applications. Once the desired amount of annealing has been performed, the interior block 10 is placed in a mold (not shown) and an annular sleeve 20 of elastomeric material is cast about the exterior radial surface 18 of the interior block 10. Preferably, the sleeve 20 completely surrounds the radial surface 18 of the interior block 10, and has an initial axial length generally the same as the initial axial length of the cylindrical block 10. The resulting product is a cylindrically shaped composite preform 22 as shown in FIG. 2. Also preferably, the sleeve 20 is made of du Pont's HYTREL composition No. 7246, which is relatively hard to increase the resistance to deflection of the composite preform 22. According to one method, the composite preform 22 may be subsequently annealed a desired amount to remove undesirable residual strains and enhance the crystaline structure of the material.

It will be appreciated that other conventional manufacturing techniques can be utilized to place the sleeve 20 around the interior block 10. In addition, the sleeve 20 can be chemically bonded or otherwise secured to the interior block if desired.

Preferably, the thickness of the sleeve 20 is less than 15% of the outer diameter of the composite preform 22, although a range between about 5% and 35% has been found to produce satisfactory results. It will be appreciated by those skilled in the art that the operating characteristics of the composite spring of the present invention can be varied by changing the shape and size of the interior block 10, the core opening 12, and the annular sleeve 20. For example, if a softer spring with a higher spring deflection rate per unit load is desired, the size of the core opening 12 can be enlarged, or the thickness of the sleeve 20 can be reduced, or both. The shape of the composite preform 22 can also be varied to suit particular applications. For example, the composite preform 22 can be cylindrical, oval, rectangular or square in cross-section. In the preferred embodiment the transverse shape of the interior block 10, core opening 12 and exterior sleeve 20 are similar and co-axial, so that the symmetry of the composite preform 22 is maintained.

The composite preform 22 is not adequate to serve as a compression spring, however, until after the performance of additional manufacturing steps. This is primarily due to the fact that HYTREL and similar elastomers take a compression set, upon an initial compression beyond about 20% and will not return to their original length. The compression set characteristic of the elastomer can be overcome by initial compression beyond about 30%. Beyond such a degree of compression orientation of the molecular structure occurs.

Figure 3:
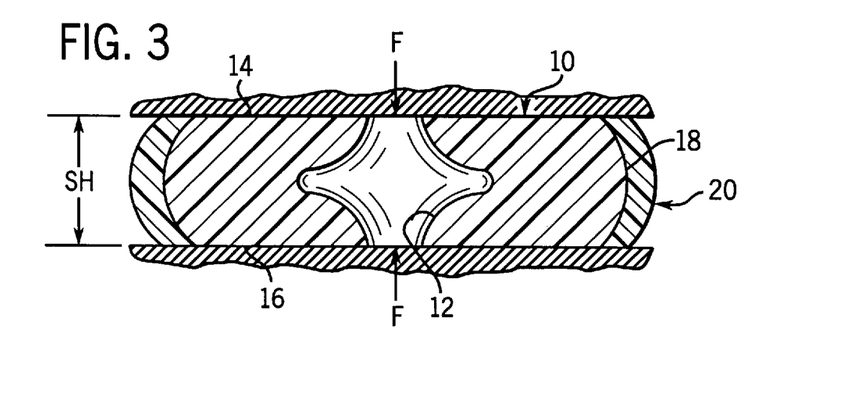
FIG. 3 is a cross-sectional front elevational view of the composite spring shown in FIG. 2 depicted in the process of having an axial compressive force applied to the composite spring.
Figure 4:
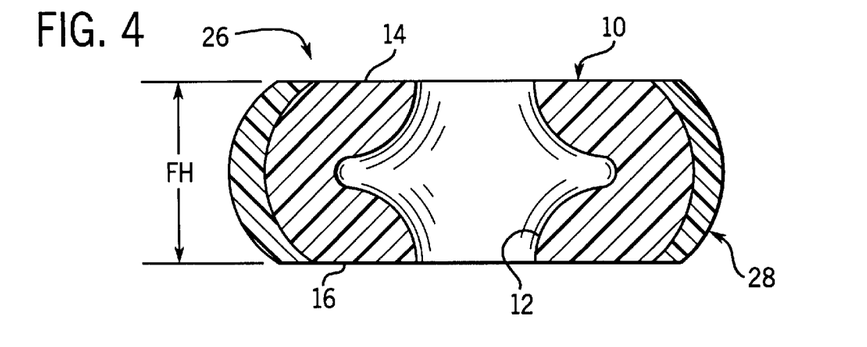
FIG. 4 is a cross-sectional front elevational view of the composite spring shown in FIG. 3 depicted after the axial compressive force is removed from the composite spring.

In the manufacture of the present invention, and as shown in FIG. 2, the composite preform 22 is fabricated to establish a predetermined molded height MH therefor. The composite preform 22 with the predetermined molded height MH is then inserted into a suitable compression apparatus such as press 44 (FIGS. 15 and 16) where it is compressed by at least 30% of its axial length to a solid height SH as shown in FIG. 3. As will be appreciated, the amount of compression applied to the preform being predetermined by the ultimate application of the spring. When the downward force of the press 44 is removed, a composite compression spring 26 is provided which recovers or extends back to a free or installed height FH as shown in FIG. 4. Notably, the free height FH of the compression spring 26 is different than the predetermined molded height MH of the composite preform. As illustrated, the cylindrical composite preform 22 has been reshaped into a spherical or toroidal section 28. After the forming step and partial recovery, the resulting compression spring 26 is relatively free of the compression set problem and, upon subsequent compressions (travel), will generally return to the free height FH reflected in FIG. 4.

The particular spring characteristics of the present invention are the result of the configuration of the elements which make-up composite preform, as well as the balance of the various types (durometer) of the elastomer employed. In the illustrated embodiment and as known in prior art, the soft interior block 10 has a tendency to resist energy upon compressing and provide elastic return. While the stiff exterior sleeve 20 also provides resistance to energy upon compression it provides a much lower elastic return that the inner block 10. That is, in the illustrated embodiment, the stiff exterior sleeve 20 has a tendency to resist the spring back characteristic of the interior block upon removal of the external force.

Figure 5:
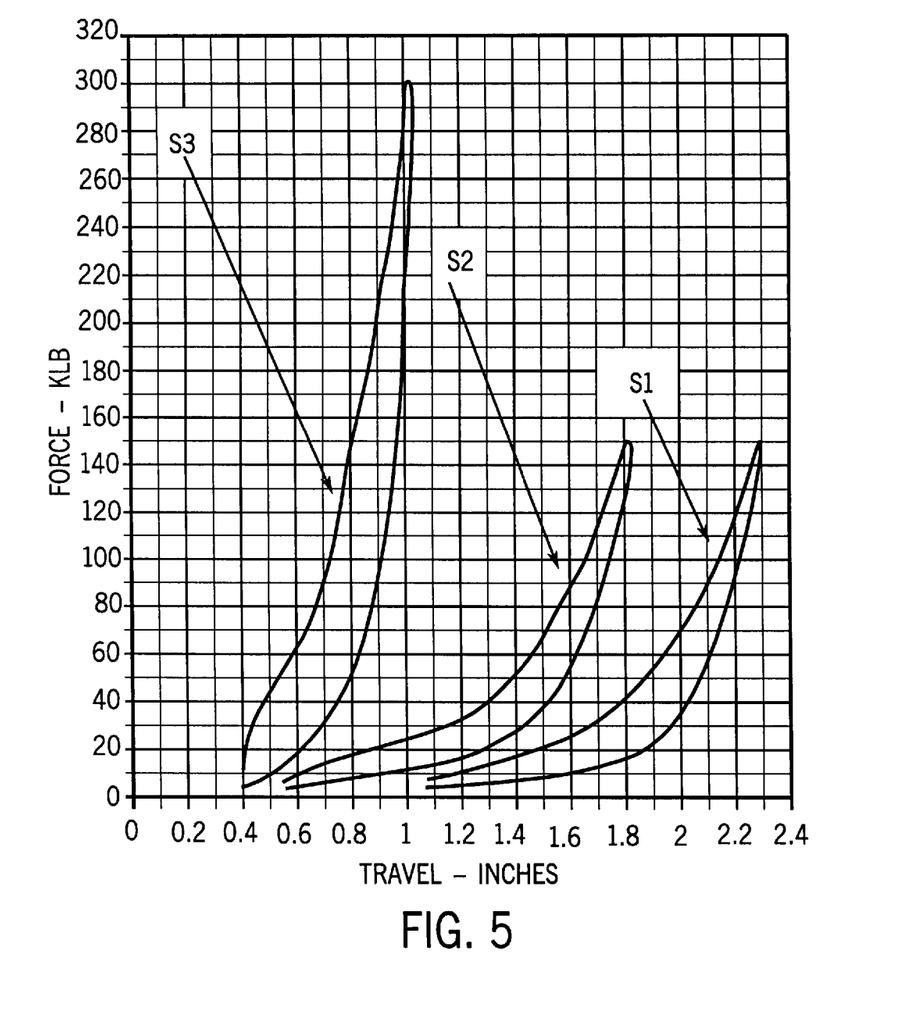
FIG. 5 is a force-travel diagram illustrating the results of static tests on a first elastomeric spring having a first durometer hardness, a second spring having a second durometer hardness, and a composite spring made in accordance with the present invention having a first and second durometer hardness.
Figure 6:
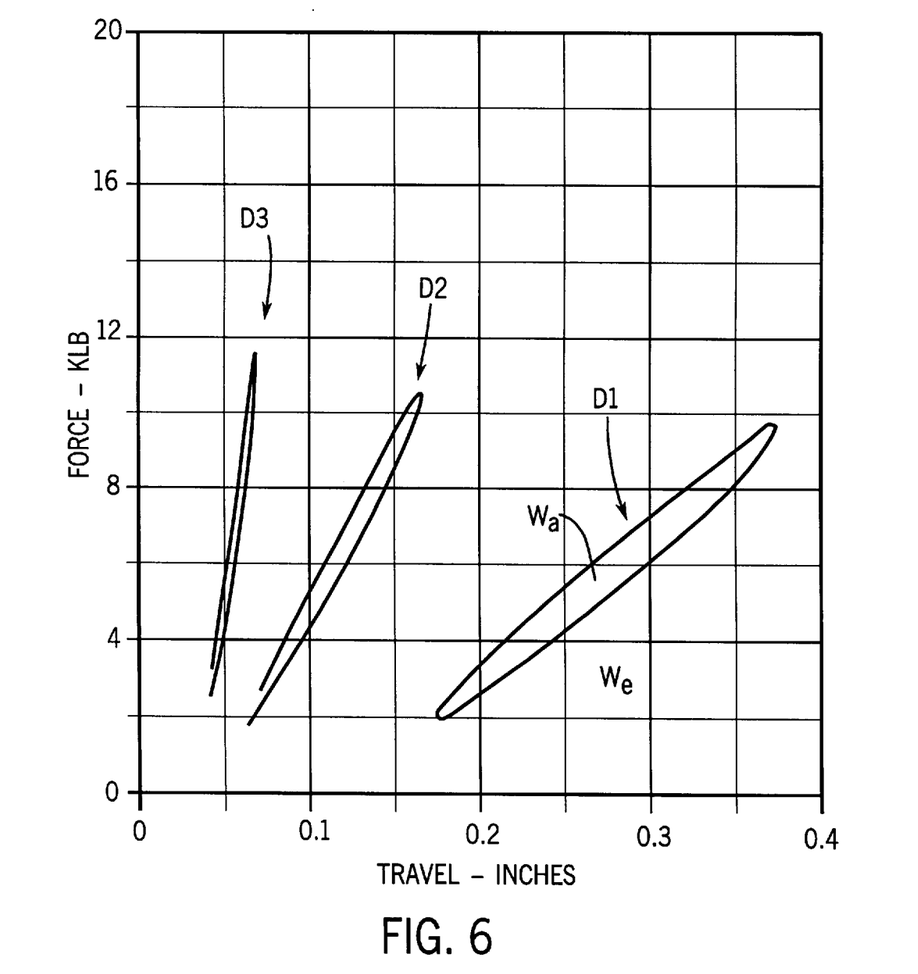
FIG. 6 is a force-travel diagram illustrating the results of dynamic loads on the springs referred to in FIG. 5.

These characteristics are illustrated in the force-deflection curve shown in FIGS. 5 and 6. The vertical axis on which the curves are plotted represent the axial force applied to the spring in thousands of pounds. The horizontal axis represents the axial displacement of the spring in inches resulting from the applied force. As shown in FIG. 5, three force-deflection curves represent the characteristics of three springs S1, S2 and S3 under static load after second closure, with each spring having a different force travel curve. In each instance, the springs S1, S2 and S3 were made from a block of copolyester polymer elastomer material having an outside diameter of about 5.80 inches. Each spring S1, S2 and S3 in this example also had a hollow core which defines an inner diameter of about 2.50 inches. The forming steps for all three springs in the example were also the same. That is, the springs S1, S2 and S3 all began with a molded height MH of 5.47 inches. They were then compressed to a solid height SH of 2.22 inches. In this particular application, the spring, such as S1, will not be compressed to a height less than 2.22 inches. Therefore, during manufacturing, each preform was compressed the same, but only enough to create a spring suitable for the application.

The performance characteristics of composite spring S1, made in accordance with the present invention, are evidenced in FIG. 5. The composite spring S1 had an interior block of the the 5556 durometer elastomeric material referenced above and an exterior sleeve of the 7246 durometer elastomeric material referenced above. The wall thickness of the sleeve was about 0.76 inches.

Similarly, the performance characteristics of a "soft" spring S2 having identical dimensions to spring S1 but formed only of the 5556 durometer material mentioned above is represented in FIG. 5.

The performance characteristics of the third spring S3, representing characteristics of a "hard" spring, is also schematically represented in FIG. 5. The spring S3 has dimensions identical to S1 and S2, but is formed only of the 7246 durometer material mentioned above.

In order to better understand the information in FIG. 5, it should be appreciated that although springs all S1, S2 and S3 began with the same molded height MH (i.e., the same preform dimensions) and were compressed to the same solid eight SH, the free height FH of each is different. In the example provided, the spring, S3, had a free height FH of about 3.27 inches while the spring, S2, had a free height FH of about 4.05 inches. This is to be expected since softer elastomers return closer to the original molded height that hard elastomers. Spring S1 had a free height FH of about 4.52 inches.

Figure 11:
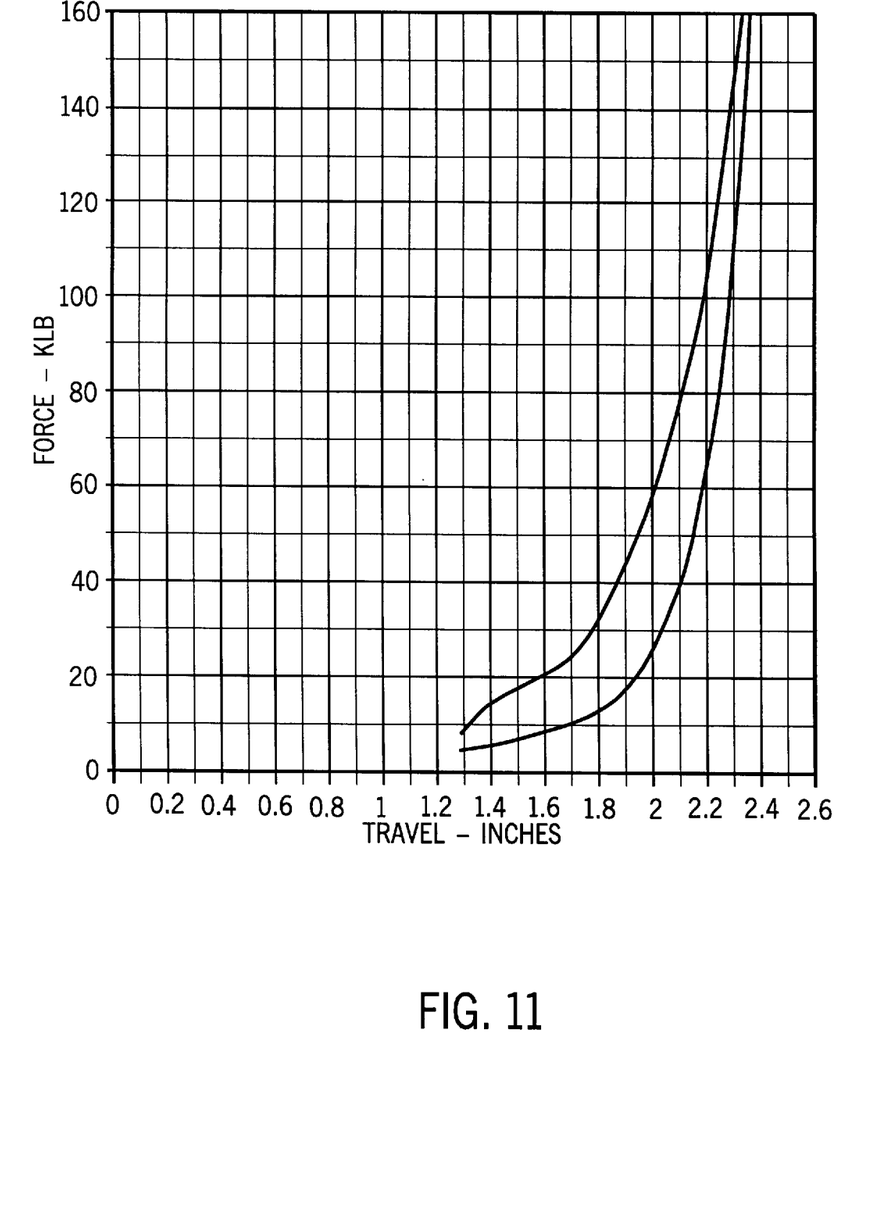

One indication of compression spring value is known as effective spring action. This can be measured by dividing the available travel by the predetermined solid height SH of the elastomer spring. The composite spring S1, made in accordance with the teachings of the present invention, offered surprising results. As compared to the solid elastomeric springs S2 and S3, and as illustrated in FIG 11, the curve associated with composite spring, S1, represents the best performance because the "second closure" available travel is about twice the available "second closure" travel of the hard spring, S3, and is similar to the second closure of the soft spring, S2. As shown in FIG. 5, S1 has an available travel of 2.30 inches which yields a more desirable spring than could be predicted from an understanding of the characteristics of S2 (available travel 1.83 inches) and S3 (available travel 1.05 inches). Thus, the composite spring has a much greater "effective spring action" which facilitates absorption without sacrificing available travel.

Another measurement of characteristic value regarding this invention is the absorption, or amount of energy retained by the spring, and not returned as elastic energy, as the spring is released. This is expressed in FIG. 6 as $W_a/W_e$. $W_e$ represents the energy needed to compress the springs; $W_r$ (not used in this description) would be the energy returned by the spring during the spring's release. In a typical compression release diagram, "$W_e$" would be the area between the upper curve and the X-axis. "$W_r$" would be the area under the lower (return) curve and the X-axis. "$W_a$" is the area between the above two curves ($W_e-W_r$).

The three force-deflection curves, D1, D2 and D3, shown in FIG. 6 represent the same three springs S1, S2 and S3, respectively, as tested in FIG. 5 under dynamic cycling testing in the critical working range of 2,000 lbs. to 10,000 lbs. As illustrated, the curve D1 has the highest energy absorption ($W_a/W_e$) because the area within the curves is the greatest. Surprisingly, the value of "$W_a/W_e$" (D1) does not lie between the values of D2 and D3, but has a value significantly greater than either D2 or D3. Thus, the composite spring of the present invention produces a higher level of energy absorption consistent with maintaining desirable force-travel performance requirements. Therefore, the construction of the present invention provides a superior product for suspension shock absorbing applications.

FIGS. 7–11 are force travel curves of the individual components of the composite spring as shown in FIG. 4. More specifically, several composite springs, similar to compression spring 26 shown in FIG. 4, were manufactured to the same specification i.e. molded height MH, and solid height SH, as previously described.

Figure 7:
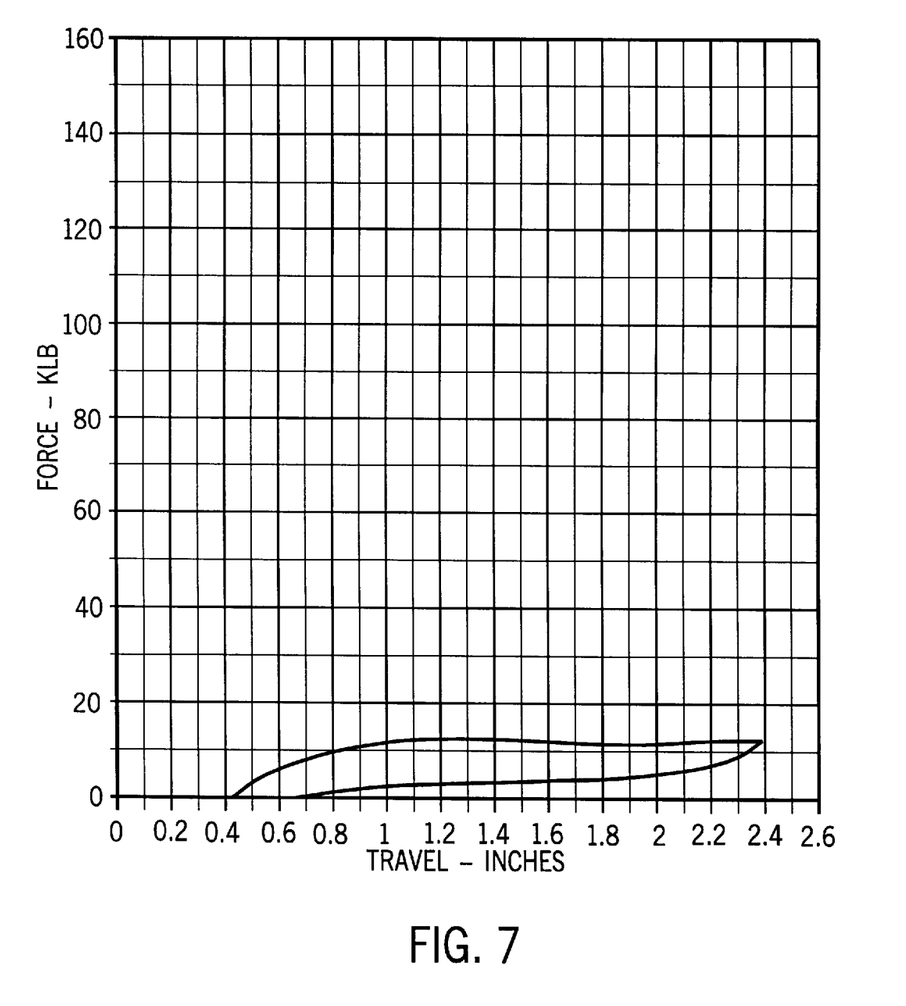
FIGS. 7 through 11 are force-travel diagrams of the individual component pieces of the spring assembly illustrated in FIGS. 1 through 4.

FIG. 7 represents a force travel curve of a spring formed similar to the spring S1 of the present invention but having all of the center 5556 durometer material removed (i.e., interior block 10 in FIG. 4) after forming the spring S1. That is, the force travel curve illustrated in FIG. 7 represents performance characteristics of only the sleeve portion 20 formed from the 7246 durometer elastomeric material mentioned above.

Figure 8:
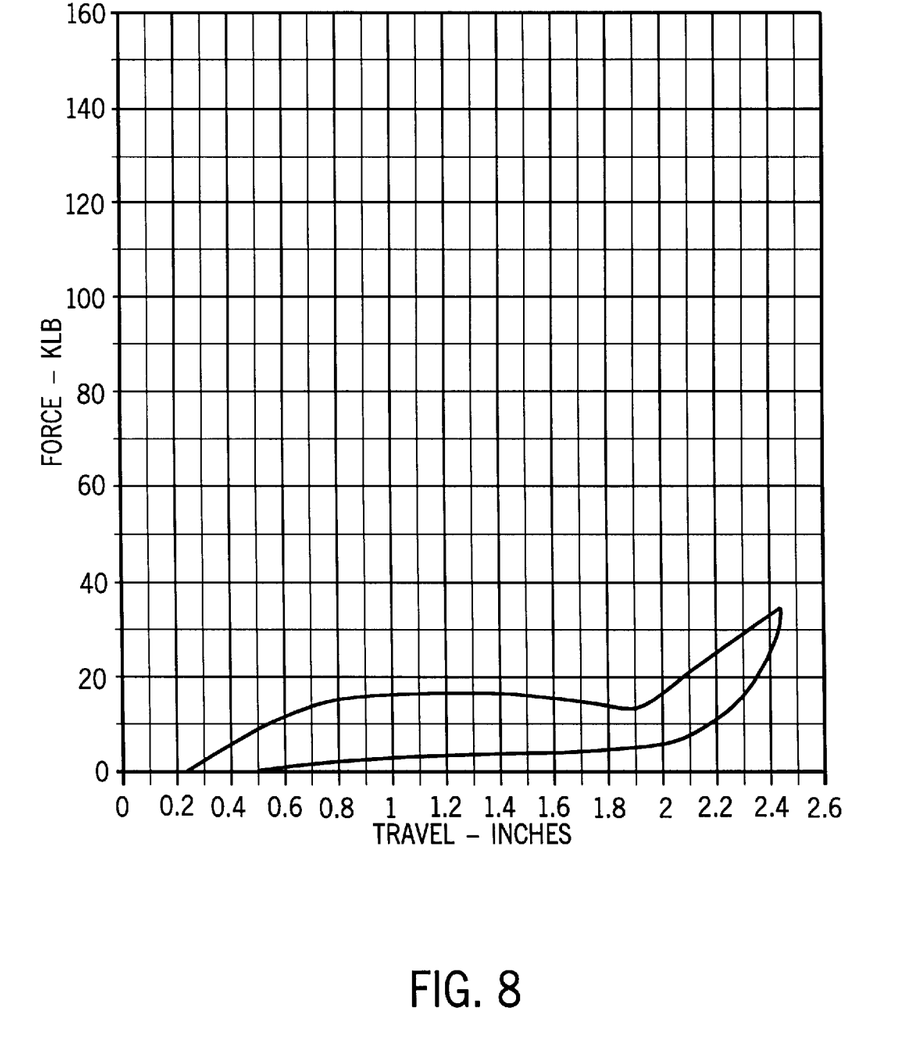

FIG. 8 represents a force travel curve of just a sleeve 20 of the 7246 durometer hardness material having the same dimensions as shown in FIG. 2 and formed using the specifications described above. That is, a sleeve of 7246 durometer material having the same dimensions as described above was formed, compressed and released and the performance characteristics of the sleeve 20, by itself, is schematically represented in FIG. 8.

Figure 9:
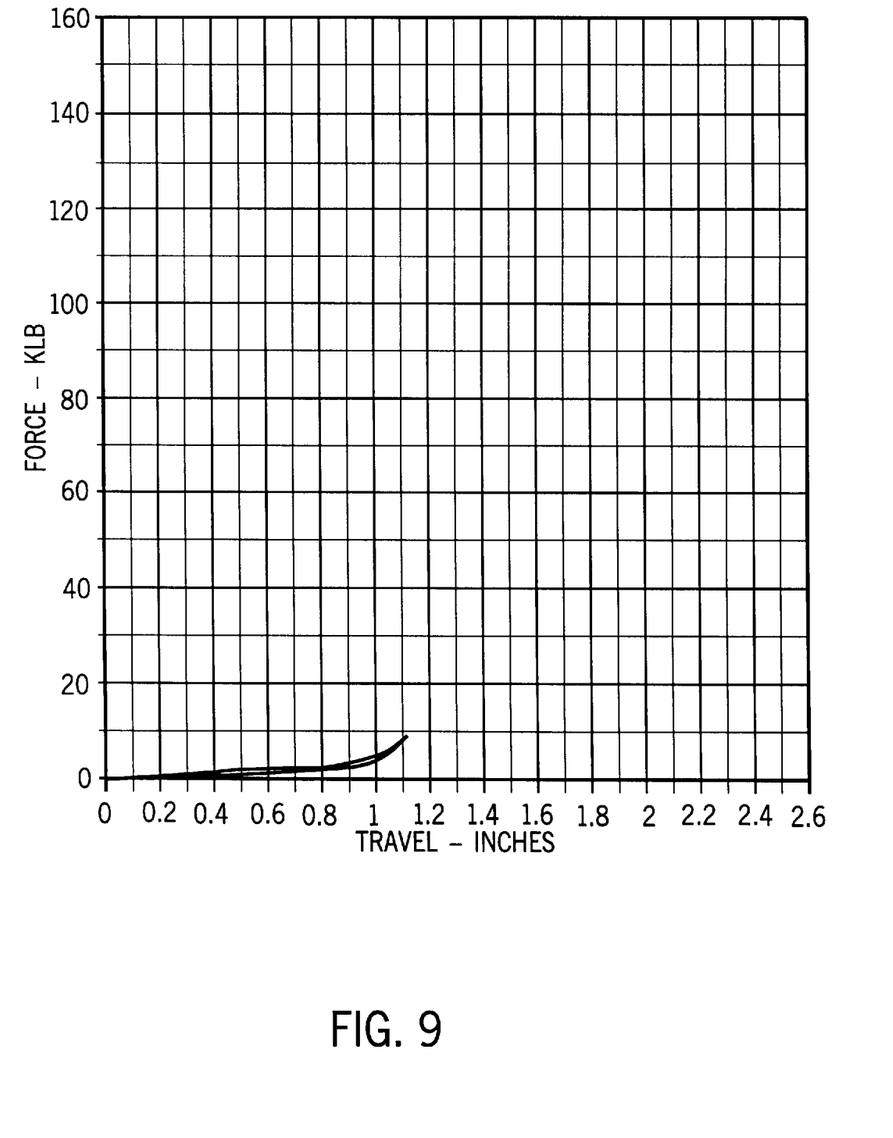

FIG. 9 represents a force travel curve of a spring formed similar to the spring S1 of the present invention but having all the sleeve material formed of the 7246 durometer material removed therefrom. That is, FIG. 8 schematically represents a force travel curve of the inner block acting on its own.

Figure 10:
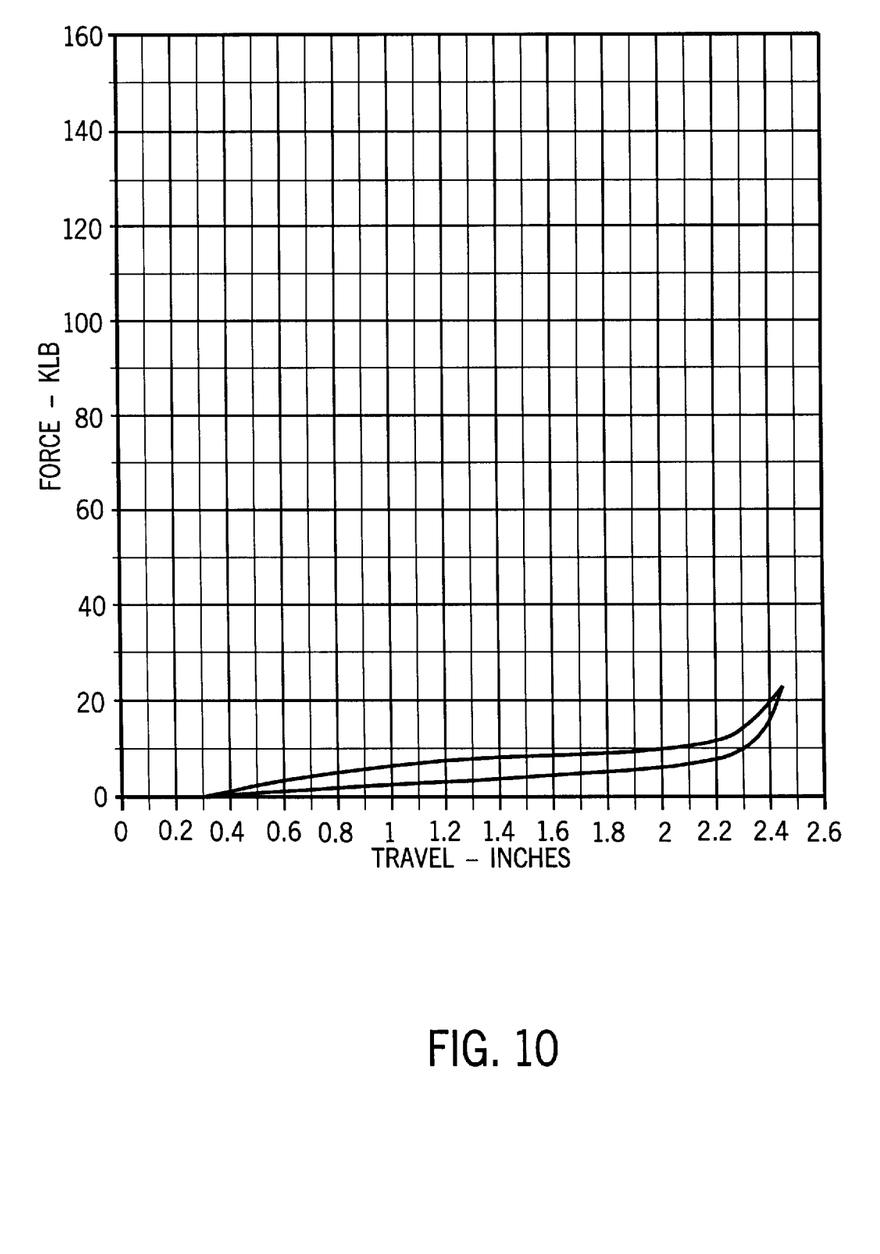

FIG. 10 represents a force travel curve of just the interior block 10 of the 5556 durometer material having the same dimensions as shown in FIG. 2 and formed by itself using the same specification as described above. That is, a 5556 durometer material having the same dimensions as described above was formed, compressed and released and the performance characteristics of that material, by itself, is schematically represented in FIG. 10.

FIG. 11 represents a force travel curve of a composite spring manufactured in accordance with the present invention and the same as the spring components represented in FIGS. 7 and 9. The spring whose performance characteristics are schematically represented in FIG. 11 was tested in an assembled condition as a normal compression spring.

As will be evident from a comparison of the individual pieces comprising the composite spring of the present invention, the sum of the force travel curves of the individual pieces is less than the force travel curve of the composite spring as a whole.

Figure 12:
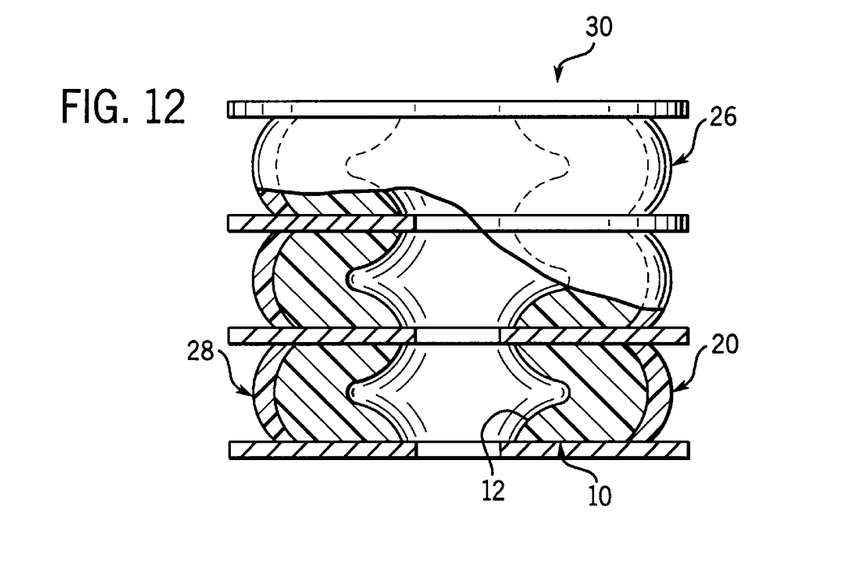
FIG. 12 is a partial cross-sectional elevational view of a series of composite springs joined by intermediate plates for use within a suspension system or similar application.

FIG. 12 illustrates a plurality of composite compression springs 26 according to the present invention configured with mounting plates and attached to each other in a conventional manner to form a compression spring assembly 30. The spring assembly 30 can be utilized, for example, in buffers or draft gears on rail cars to absorb shock during coupling and other physical impact forces that may occur between rail cars. Various types of spring assemblies can be constructed in accordance with the present invention utilizing other types of mounting plates, flanges, or other devices for interconnecting several springs together in a desired manner.

Figure 13:
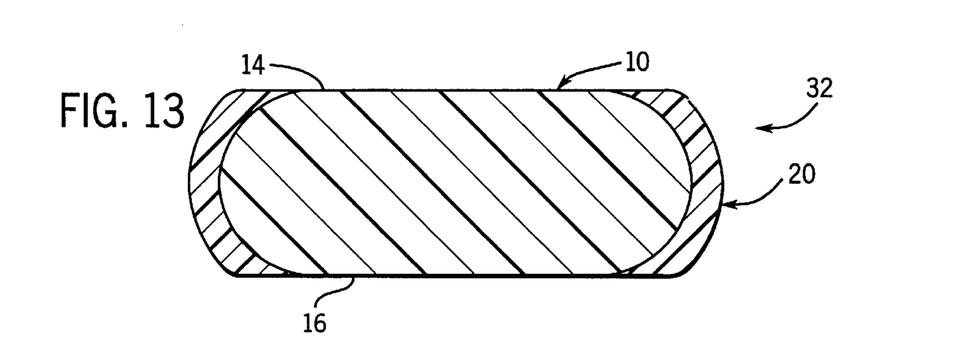
FIG. 13 is a partial cross-sectional view of an alternative embodiment of the present invention shown without a central opening therethrough.

An alternative embodiment of the present invention is illustrated in FIG. 13. As shown, a composite spring 32 is manufactured without a central core as in the previously described embodiment. Since the spring 32 is similar to the previously described spring 26, similar parts appearing in FIG. 13 are represented by the same reference numerals as in FIGS. 1–4. As noted above, the shape and size of the interior block 10 and the annular sleeve 20 in FIG. 13 can be changed to reflect the desired characteristics of the spring 32.

Figure 14:
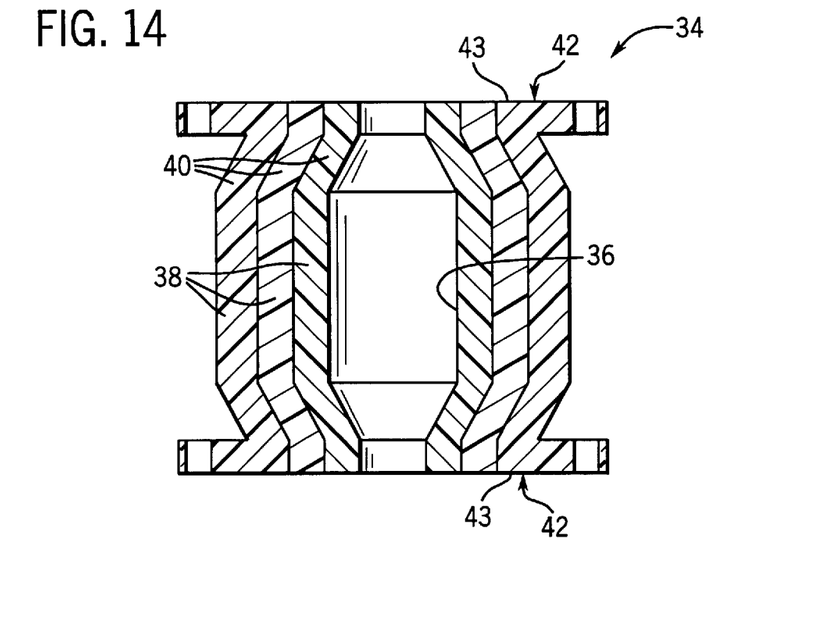
FIG. 14 is a front cross-sectional elevational view of another alternative embodiment of the present invention showing a preform composite spring prior to application of an axial compressive force, and illustrating a central axial core in the interior block and multiple exterior layers of elastomeric material molded to an interior block.

Yet another alternative embodiment of the present invention is illustrated in FIG. 14. As shown, a composite spring 34 is manufactured with a central core 36 as in the embodiment shown in FIGS. 1–3. The spring 34 includes multiple layers or laminations 38 of elastomeric material having different hardness. Any number of layers can be used, and two or more of the layers can have the same durometer hardness. Also, the shapes of each layer are complimentary and have frusto-conically shaped terminal end portions 40. Rather than utilizing separate mounting plates as shown in FIG. 12, the embodiment in FIG. 14 has flanges 42 extending radially outwardly from and between opposing edges 42 of the outer layer 38.

Figure 15:
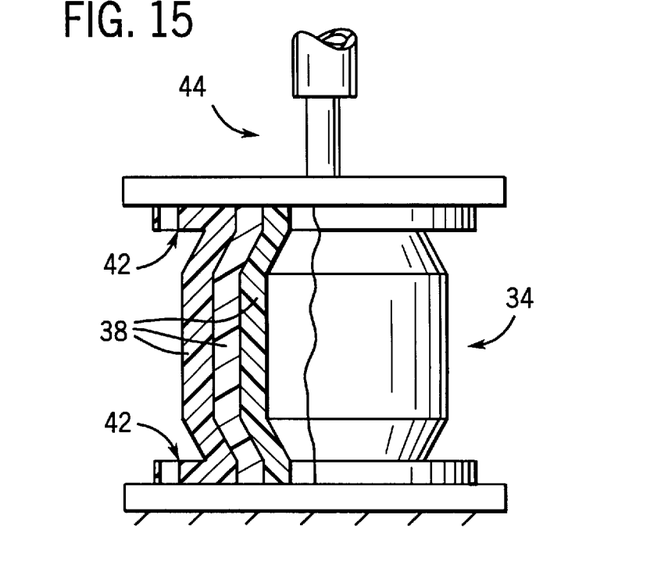
FIG. 15 is a cross-sectional front elevational view of the composite spring shown in FIG. 14 while initially placed in a compression device.
Figure 16:
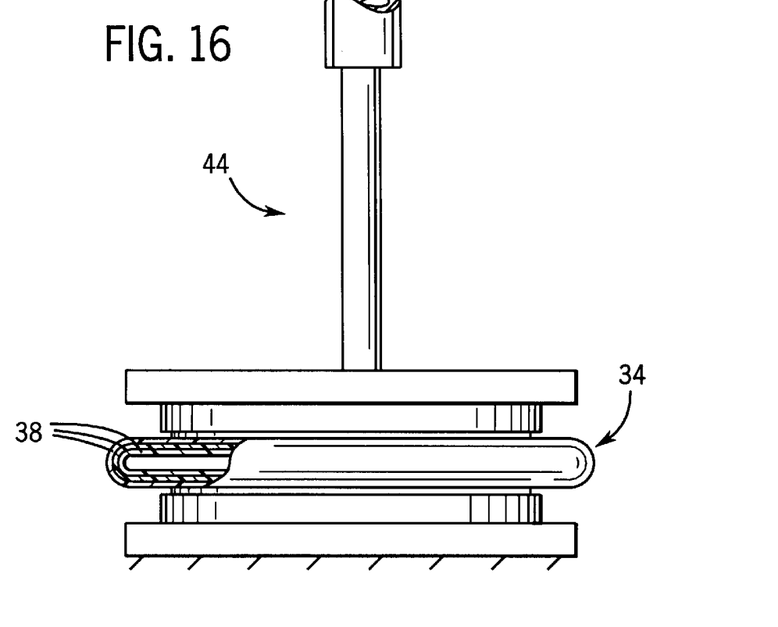
FIG. 16 is a cross-sectional front elevational view of the composite spring shown in FIG. 14 in the process of having an axial compressive force applied to the composite spring.
Figure 17:
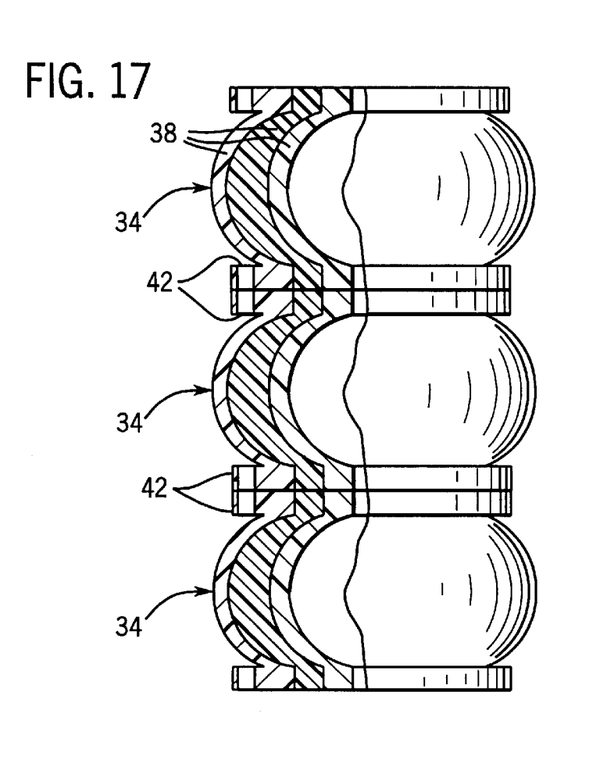
FIG. 17 is a partial cross-sectional elevational view of a series of composite springs depicted after the axial compressive force has been removed and joined by molded flanges for use within a suspension system or similar application.

FIG. 15 illustrates the composite spring 34 initially placed in a compression device 44, and FIG. 16 shows the composite spring 34 in the process of having an axial compressive force applied thereto. FIG. 17 illustrates a series of composite springs 34 depicted after the axial compressive force has been removed and joined by the molded flanges 42 for use within a suspension system or similar application.

Figure 18:
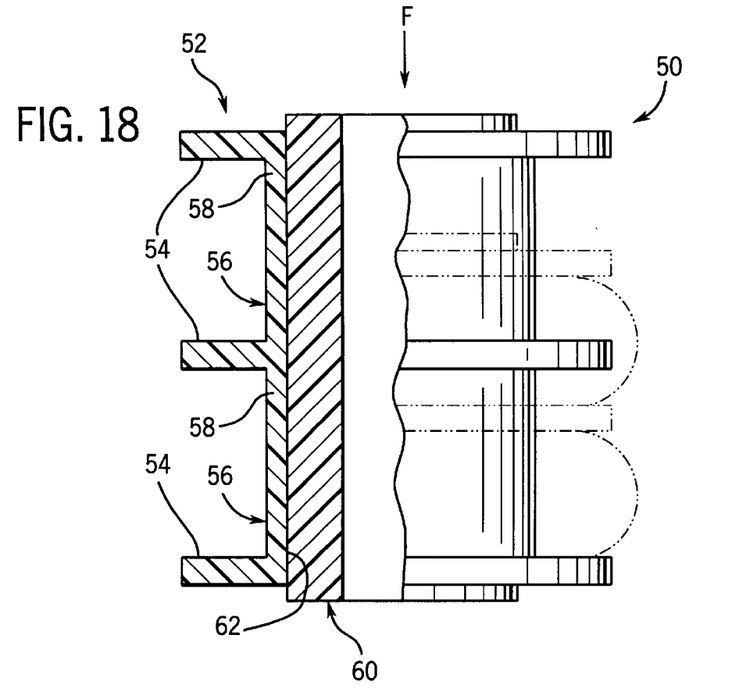
FIG. 18 is a front cross-sectional elevational view of another alternative embodiment of the present invention showing a preform composite spring prior to application of an axial compressive force, and illustrating a central axial core in the interior block and a plurality of flanges extending radially outwardly from an exterior layer.

FIG. 18 illustrates another aspect of the present invention directed to a method of making a symmetrically bulging elastomeric spring 50. A one-piece cylindrical member 52 of elastomeric material is formed, preferably by a molding operation, with a plurality of spaced stress concentration areas thereon. In this form of the invention, the stress concentration areas are configured as flanges 54 extending radially outwardly therefrom. The cylindrical member 52 has a predetermined initial axial length divided in sections 56 by the flanges 54. Preferably, the flanges 54 are equally spaced so that each section 56 has a lateral surface 58 defining an initial transverse shape. An axial force is then applied to the cylindrical member 52 to compress the axial length thereof, thereby causing the sections 56 to bulge outwardly in substantially equal proportion as defined by the flanges 54. The axial force is then removed from the cylindrical member 52 such that the shapes of the individual spring sections 56 are permanently expanded transversely outwardly from their initial transverse shapes, as shown in dashed lines in FIG. 13. Preferably, and as shown in the illustrated embodiment in FIG. 18, an inner member 60 of elastomeric material has a predetermined initial shape complimentary to the cylindrical member 52 and is positioned within a cavity 62 formed in the cylindrical member 52. Thus, the application of force causes the corresponding sections 56 of the inner member 60 to bulge outwardly with the sections 56 of the exterior cylindrical member 52. In order to obtain the desirable force-travel characteristics referred to above in connection with the foregoing embodiments, the cylindrical member 52 has a first durometer hardness and the inner member has a second durometer hardness.

Figure 19:
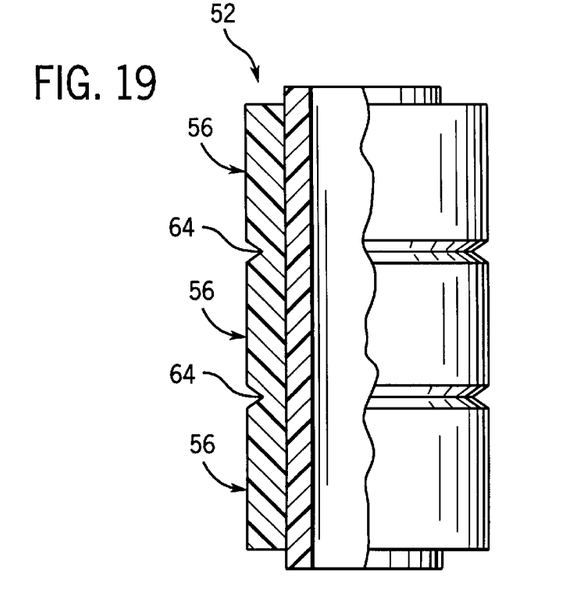
FIG. 19 is a front cross-sectional elevational view of yet another alternative embodiment of the present invention showing a preform composite spring prior to application of an axial compressive force, and illustrating a central axial core in the interior block and a plurality of relief notches extending radially outwardly from an exterior layer.

FIG. 19 illustrates another embodiment of the invention showing the formation of equally spaced relief notches 64 around the periphery of the cylindrical member 52 to thereby cause the respective sections to bulge outwardly in proportional relation.

Thus, an improved compression spring is provided with a composite elastomer material to increase energy absorption while maintaining desirable functional characteristics. While the present invention has been described in combination with the application of an axial compression force being applied thereto, it will be appreciated by those skilled in the art that the teachings of the present invention can equally apply when other than an axial compressive force is applied to the formed spring, i.e., radially directed force directed inwardly toward the centerline of the preformed composite could be applied thereto. Suffice it to say, the application of other than an axial compressive force to compress the preform is likewise intended to come within the spirit and scope of the present invention.

From the foregoing, it will be observed that numerous modifications and variations can be effected without departing from the true spirit and scope of the novel concept of the present invention. It will be appreciated that the present disclosure is intended to set forth exemplifications of the invention, which are not intended to limit the invention to the specific embodiments illustrated. The disclosure is intended to cover by the appended claims all such modifications as fall within the scope of the claims.

What is claimed is:

1. A method of making a composite elastomeric spring having a predetermined final shape, comprising:

providing a first elongate tubular member of elastomeric material having a first durometer hardness, said first member having a predetermined initial shape;

providing a second elongate tubular member of elastomeric material having a second durometer hardness, said second member having a predetermined initial shape complimentary to the first member and adapted to be positioned in surrounding relation about said first member;

positioning said second member adjacent said first member in said surrounding relation to define a preform composite spring member; and applying a force to said preform composite spring member sufficient to simultaneously compress said first member and second member, thereby permanently changing the respective initial shapes of said first member and said second member, and removing said force from and thereby allowing said composite spring member to transmute to the predetermined final shape of said composite elastomeric spring.

2. The method of claim 1 wherein the second member of said preform composite spring member comprises an outer layer that circumferentially surrounds the first member of said composite spring member.

3. The method of claim 2 wherein said outer layer of elastomeric material is formed and positioned in circumferential relation to the first member by a molding operation.

4. The method of claim 3 wherein said outer layer is bonded to the first member.

5. The method of claim 2 wherein the predetermined initial shapes of said first member and said outer layer are substantially cylindrical so that the first member and outer layer will be generally torodial when compressed by said force.

6. The method of claim 5 wherein the core opening extends entirely through the first member.

7. The method of claim 1 wherein said outer layer has a thickness that is between about 5% and 35% of an outer diameter of the preform composite spring member.

8. The method of claim 1 further comprising a third member of elastomeric material, said third member having a predetermined initial shape complimentary to the first and second members and adapted to be positioned in circumferential surrounding relation about said second member, whereby said application of force simultaneously compresses said first, second and third members, thereby permanently changing the predetermined initial shapes of said first, second and third members.

9. The method of claim 1 wherein the first and second members have complimentary frusto-conically shaped terminal end portions.

10. The method of claim 1 further comprising molded flanges formed integrally with and extending radially outwardly from and between opposed ends of the second member.

11. The method of claim 1 wherein the first member has an initial length substantially the same as an initial length of the second member.

12. The method of claim 1 wherein the material of the first member and the material of said second member are such that the composite elastomeric spring will permanently retain a substantial portion of the change in shape of the preform composite spring member after the step of removing said force from said composite spring member has been effected.

13. The method of claim 1 wherein said first member and second member both comprise a copolyester polymer elastomer material.

14. The method of claim 1 wherein the first member has an initial core opening extending substantially therethrough, said first member and said opening being uniform in crosssections perpendicular to a central axis, the configuration of said initial core opening being permanently expanded transversely outwardly upon application of said initial force to thereby provide a hollow compression spring member.

15. The method of claim 1 wherein the durometer hardness of said first elongate member is lower than the durometer hardness of said second elongate member whereby the first member has a greater tendency to spring back upon the application of a force thereon than does said second member.

16. A method of making a composite elastomeric spring having a final torodial shape, comprising:

providing a substantially elongate cylindrical interior block of elastomeric material defining an initial axial length between spaced ends and an exterior radial surface, said cylindrical block having a generally cylindrical core extending axially substantially through a center of said cylindrical block;

forming an annular layer of elastomeric material circumferentially about said exterior radial surface of the interior block to define a generally cylindrically shaped preform composite spring member, said annular layer having a durometer hardness greater than that of said interior block, said annular layer having an initial axial length between spaced ends generally equal to said initial axial length of the interior block;

applying an axial force to said preform composite spring member sufficient to simultaneously compress said interior block and annular layer a desired amount of their respective initial axial lengths, thereby reducing their initial axial lengths and changing the cylindrical shapes of said block and layer; and removing said axial force from and thereby allowing said preform composite spring member to transmute to the final torodial shaped said composite elastomer spring.

17. The method of claim 16 wherein the material forming the interior block and the material forming the annular layer are such that the final torodial shape of the elastomeric composite spring will permanently retain a substantial portion of the length reduction of said preform composite spring member after said block and layer of said preform composite spring member are compressed a desired amount of their initial axial length.

18. The method of claim 16 wherein said annular layer has a thickness that is between about 15% and 35% of the outer diameter of the preform composite spring member.

19. The method of claim 16 wherein said interior block and annular layer both comprise a copolyester polymer elastomer material.

20. The method of claim 16 wherein said axial force compresses said interior block and annular layer to about 30% of said initial axial lengths.

21. A composite elastomeric spring having a final shape, comprising:
   a first member of elastomeric material having a first durometer hardness and a ratio of plastic strain to elastic strain that is greater than 1.5 to 1, said first member having a molecular structure oriented in at least one direction and defining a transverse shape, and wherein said first elastomeric member has a first spring rate; and
   a second member of elastomeric material positioned adjacent and in circumferentially surrounding relation relative to a lateral surface of and in captured engagement with the first member, said second member having a second durometer hardness offering a second spring rate, said second member furthermore having a ratio of plastic strain to elastic strain that is greater than 1.5 to 1 and a molecular structure oriented in at least one direction; and
   wherein the captured relationship of said first and second members yielding a third spring rate to the final shape of the composite elastomeric spring effective in either compression or expansion modes of operation of said composite elastomeric spring, with said third spring rate being different than either said first or second spring rates.

22. The spring of claim 21 wherein the first member has an axial length substantially the same as an axial length of the second member.

23. The spring of claim 22 wherein said first durometer hardness is lower than said second durometer hardness so that the first member is made of a generally softer material than said second member, whereby the first member has a greater tendency to spring back upon the application of a force thereon than does said second member.

24. The spring of claim 21 further comprising a third member of elastomeric material, said third member having a ratio of plastic strain to elastic strain that is greater than 1.5 to 1 and a molecular structure oriented in at least one direction, wherein said third member is configured in adjacent and surrounding circumferential relation relative to the first and second members, said third member further effecting the third spring rate of said composite elastomeric spring.

25. The spring of claim 21 further comprising molded flanges extending radially outwardly from and between opposed ends of the second member.

26. The spring of claim 21 wherein the first member has a hollow core formed therein.

27. The spring of claim 21 wherein said second member has a substantially uniform radial thickness ranging between about 5% and 35% of the outer diameter of the final shape of the composite elastomeric spring.

28. The spring of claim 21 wherein the transverse shapes of said first member and said second member are generally toroidal.

29. The spring of claim 21 wherein said first member and second member both comprise a copolyester polymer elastomer material.

30. A method of making an elastomeric spring having a symmetrically bulging final shape, comprising:
   providing a core of elastomeric material having a first durometer hardness, said core having an initial shape;
   providing a one-piece elongated member of elastomeric material having a second durometer hardness in circumferentially surrounding relation relative to said core to define a composite preform, said member being formed with an annular stress concentration area, said elongated member having a predetermined initial axial length divided in sections by said stress concentration area, each section having a lateral surface defining an initial shape;
   applying a compressive force to said composite preform sufficient to simultaneously compress and permanently change the initial shapes of said core and elongated member, said application of force causing said sections to bulge outwardly in substantially equal proportion as defined by the stress concentration area; and
   removing the compressive force from and thereby allowing said composite preform to transmute to the final shape of the elastomeric spring with the shapes of said sections being permanently expanded radially outwardly from their initial shapes.

31. The method of claim 30 wherein the stress concentration area is defined by a circumferential relief notch formed around a periphery of the elongated member.

32. The method of claim 30 wherein said core of said preform is bonded to the elongated member.

33. The method of claim 30 wherein the stress concentration area is defined by a flange extending perpendicularly outwardly from a periphery of said elongated member.

34. A method of making an elastomeric spring having a symmetrically bulging final shape, comprising:
   providing a core of elastomeric material having a first durometer hardness, said core having an initial shape including an initial axial length;
   providing a one-piece cylindrical member of elastomeric material having a second durometer hardness in surrounding circumferential relation relative to said core to define a composite preform, said one-piece cylindrical member being formed with a plurality of equally spaced flanges extending radially outwardly therefrom and has a predetermined initial axial length divided in equal sections by said flanges, with each section having a lateral surface defining an initial shape;
   applying an axial force to said composite preform so as to simultaneously compress and permanently change the initial axial lengths of the cylindrical member and said core while thereby causing said sections to bulge outwardly in substantially equal proportion as defined by the flanges; and
   removing the axial force from and allowing said composite preform to transmute to the final shape of said elastomeric spring with the shapes of said sections being permanently expanded outwardly from their initial shapes.

35. The method of claim 34 wherein the core of said composite preform is bonded to the cylindrical member.

36. A method of making an elastomeric spring having a symmetrically bulging final shape, comprising:
   providing a core of elastomeric material having a first durometer hardness, said core having an initial shape including an initial length;

providing a one-piece cylindrical member of elastomeric material having a second durometer hardness in surrounding circumferential relation relative to said core to define a composite preform, said one-piece cylindrical member defining a plurality of equally spaced relief notches around a periphery thereof and has a predetermined initial axial length divided in sections by said notches, each section having a lateral surface defining an initial shape;

applying an axial force to said composite preform so as to simultaneously compress and permanently change the initial axial lengths of the cylindrical member and said core while thereby causing said sections to bulge outwardly in substantially equal proportion as defined by the notches; and removing the axial force from and allowing said composite preform to transmute to the final shape of said elastomeric spring with the shapes of said sections being permanently expanded outwardly from their initial shapes.

37. The method of claim 36 wherein the core of said composite preform is bonded to the cylindrical member.

38. A composite elastomeric spring having a symmetrically bulging final shape, comprising:

a core of elastomeric material having a first durometer hardness and a ratio of plastic strain to elastic strain greater than 1.5 to 1, said core having a molecular structure oriented in an axial direction and defining an initial shape including an initial length, and wherein said elastomeric core has a first spring rate;

a one-piece elongated member of elastomeric material positioned in circumferentially surrounding relation relative to said core such that said core and said elongated member are arranged in captured engagement with each other, said elongated member having a second spring rate with a ratio of plastic strain to elastic strain that is greater than 1.5 to 1 and a molecular structure oriented in an axial direction, with said elongated member being formed with at least one transverse stress concentration area thereon dividing the elongated member into sections, with each section having a lateral surface which bulges outwardly in substantial proportion as defined by the stress concentration area to define the symmetrically bulging final shape of said elastomeric spring; and wherein the captured engagement of said core and said elongated member provides said composite elastomeric spring with a third spring rate different from said first or second spring rates and effective in either compressive or expansive modes of operation of said composite elastomeric spring.

39. The composite spring of claim 38 wherein the stress concentration area is defined by a flange extending perpendicularly outwardly from a periphery of said elongated member.

40. The composite spring of claim 38 wherein the stress concentration area is defined by a relief notch formed around a periphery of the elongated member.

41. The composite spring of claim 38 wherein said core is bonded to the elongated member.

42. A symmetrically bulging composite elastomeric spring, comprising:

a core of elastomeric material having a first durometer hardness and a ratio of plastic strain to elastic strain that is greater than 1.5 to 1, said core having a molecular structure oriented in an axial direction and having a first spring rate;

a one-piece spring member of elastomeric material having a second spring rate; with said spring member being positioned in circumferentially surrounding relation relative to said core such that said core and said spring member are arranged in captured relationship relative to each other, with said spring member having a ratio of plastic strain to elastic strain that is greater than 1.5 to 1 and a molecular structure oriented in an axial direction, said spring member being formed with a plurality of equally spaced flanges extending radially outwardly therefrom to thereby divide the spring member into equal sections, each section having a lateral surface which bulges outwardly in substantial proportion as defined by the flanges to define the symmetrically bulging configuration of said elastomeric spring; and wherein the captured engagement of said core and said spring member provides said composite elastomeric spring with a third spring rate different from said first or second spring rate and effective in either compressive or expansive modes of operation of said composite elastomeric spring.

43. The composite spring of claim 42 wherein said core is bonded to the spring member.

44. A symmetrically bulging composite elastomeric spring, comprising:

a core of elastomeric material having a first durometer hardness and a ratio of plastic strain to elastic strain greater than 1.5 to 1, said core having a molecular structure oriented in an axial direction and has a first spring rate;

a one-piece spring member of elastomeric material having a second spring rate, with said spring member being positioned in circumferentially surrounding relation relative to said core such that said core and spring member are arranged in captured relationship relative to each other, with said spring member further having a ratio of plastic strain to elastic strain that is greater than 1.5 to 1 and a molecular structure oriented in an axial direction, said spring member defining a plurality of equally spaced relief notches about a periphery thereof to thereby divide the spring member into equal sections, each section having a lateral surface which bulges outwardly in substantial proportion as defined by the relief notches; and wherein the captured relationship of said core and said spring member causing said spring member and said core to conjointly act at a third spring rate different from said first and second spring rate in response to loads acting on said elastomeric spring regardless of the direction said loads are applied to said composite elastomeric spring.

45. The composite spring of claim 44 wherein said core is bonded to the spring member.

* * * * *